(12) United States Patent
Lazarev et al.

(10) Patent No.: US 12,019,046 B2
(45) Date of Patent: Jun. 25, 2024

(54) LASER ILLUMINATION TECHNIQUES FOR CAPILLARY ELECTROPHORESIS

(71) Applicant: PROMEGA CORPORATION, Madison, WI (US)

(72) Inventors: Sergey Lazarev, Fitchburg, WI (US); Bruce Johnson, Fitchburg, WI (US)

(73) Assignee: PROMEGA CORPORATION

( * ) Notice: Subject to any disclaimer, the term of this patent is extended or adjusted under 35 U.S.C. 154(b) by 442 days.

(21) Appl. No.: 16/862,788

(22) Filed: Apr. 30, 2020

(65) Prior Publication Data

US 2021/0341420 A1 Nov. 4, 2021

(51) Int. Cl.
*G01N 27/44* (2006.01)
*G01J 1/42* (2006.01)
(Continued)

(52) U.S. Cl.
CPC .......... *G01N 27/44721* (2013.01); *G01J 1/42* (2013.01); *G02B 21/0032* (2013.01);
(Continued)

(58) Field of Classification Search
CPC ....... G01N 21/44791; G01N 27/44721; G01N 27/44743; G01N 27/44782; G01N 27/447;
(Continued)

(56) References Cited

U.S. PATENT DOCUMENTS 5,424,841 A 6/1995 Van Gelder
6,134,002 A 10/2000 Stimson
(Continued)

FOREIGN PATENT DOCUMENTS

CN 101314196 A * 12/2008 ......... B23K 26/0643
CN 101464411 A * 6/2009
(Continued)

OTHER PUBLICATIONS

PCT, Notification of Transmittal of the International Search Report and the Written Opinion of the International Searching Authority, or the Declaration, in application No. PCT/US2020/030759, dated Feb. 1, 2021 (13 pages).
(Continued)

*Primary Examiner* — Michael P Stafira
(74) *Attorney, Agent, or Firm* — MCANDREWS HELD & MALLOY, LTD (57) ABSTRACT

A laser-line-generating system generates and process a laser light to illuminate a capillary array. The laser-line-generating system includes a laser-light source, focusing optics, a first optical scanner, and a second optical scanner. The laser-light source outputs a first laser light. The focusing optics receives the first laser light and reduces a beam width of the first laser light. The first optical scanner receives the first laser light and output a first optical-scanner-outputted light by varying an angle of outputted light along a first dimension. The second optical scanner receives the first optical-scanner-outputted light and outputs a second optical-scanner-outputted light by varying an angle of outputted light along a second dimension. The second optical-scanner-outputted light includes a line with dimensional components in both the first dimension and the second dimension.

19 Claims, 7 Drawing Sheets

(51) Int. Cl.
*G01N 27/447* (2006.01)
*G02B 21/00* (2006.01)
*G02B 26/10* (2006.01)
*G02B 27/09* (2006.01)

(52) U.S. Cl.
CPC ....... *G02B 21/0076* (2013.01); *G02B 26/105* (2013.01); *G02B 27/0927* (2013.01); *G01J 2001/4247* (2013.01)

(58) Field of Classification Search
CPC ... G01N 27/44773; G01N 2035/00158; G01N 30/466; G01N 30/6091; G01N 30/6095; G01N 2030/8417; G01N 30/82; G01N 35/1074; G01N 27/44726; G01N 27/44704; G01N 35/0099; G01N 2035/00059; G01N 2035/00752; G01N 2035/0437; G01N 2035/1051; G01N 2035/1076; G01N 35/0092; G01N 1/31; G01N 1/38; G01N 2021/6439; G01N 2035/00435; G01N 2038/00851; G01N 2035/0413; G01N 2035/0415; G01N 2035/0436; G01N 2035/0468; G01N 2035/0475; G01N 2035/1013; G01N 2035/1025; G01N 2035/1048; G01N 21/6458; G01N 35/00732; G01N 35/0098; G01N 35/04; G01N 35/1002; G01N 35/1011; G01N 35/1016; G01N 35/1081; G01N 21/645; G01N 2021/0346; G01N 33/54366; G01N 15/1468; G01N 2021/058; G01N 21/05; G01N 1/30; G01N 1/36; G01N 2001/305; G01N 2001/4038; G01N 21/6456; G01N 27/44708; G01N 33/4833; G01N 33/54373; G01N 33/57484; G01N 2021/6441; G01N 21/6402; G01N 2201/06113; G01N 2021/6463; G01N 2035/1037; G01N 21/648; G01N 33/483; G01N 33/533; G01N 33/5438; G01N 15/14; G01N 2035/00326; G01N 21/253; G01N 21/552; G01N 2201/105; G01N 30/44; G01N 30/74; G01N 30/78; G01N 30/8617; G01N 35/0059; G01N 35/1065; G01N 2015/0026; G01N 2021/6421; G01N 2021/6471; G01N 2035/00039; G01N 2035/00108; G01N 21/01; G01N 21/6454; G01N 2201/068; G01N 2201/0697; G01N 27/221; G01N 27/226; G01N 30/8631; G01N 33/48; G01N 33/5005; G01N 33/5008; G01N 33/502; G01N 33/56972; G01N 35/00; G01N 1/28; G01N 15/0266; G01N 2001/002; G01N 2015/0065; G01N 15/0288; G01N 2015/1006; G01N 2015/149; G01N 2021/1712; G01N 2021/651; G01N 2021/757; G01N 2021/7779; G01N 2035/00148; G01N 2035/00247; G01N 2035/0081; G01N 21/171; G01N 21/33; G01N 21/39; G01N 21/45; G01N 21/4788; G01N 21/55; G01N 21/553; G01N 21/636; G01N 21/6445; G01N 21/658; G01N 21/75; G01N 2333/96486; G01N 2500/02; G01N 2500/04; G01N 30/0005; G01N 33/48707; G01N 33/5035; G01N 33/5061; G01N 33/532; G01N 33/542; G01N 33/543; G01N 33/54313; G01N 33/5436; G01N 33/54386; G01N 33/545; G01N 33/552; G01N 33/566; G01N 33/569; G01N 33/581; G01N 33/582; G01N 33/587; G01N 33/6803; G01N 35/00712; G02B 21/0048; G02B 21/0064; G02B 21/002; G02B 21/0032; G02B 26/105; G02B 27/0927; G02B 21/008; G02B 21/26; G02B 26/101; G02B 26/10; G02B 21/0076; G02B 21/367; G02B 19/0014; G02B 19/0052; G02B 27/30; G02B 13/0005; G02B 21/0044; G02B 21/16; G02B 21/365; G02B 26/06; G02B 26/0816; G02B 26/0875; G02B 27/40; G02B 7/08; G02B 17/023; G02B 21/06; G02B 21/14; G02B 26/023; G02B 26/08; G02B 27/0006; G02B 27/108; G02B 30/52; G02B 5/20; G02B 13/00; G02B 21/00; G02B 26/0825; G02B 26/106; G02B 26/108; G02B 27/0025; G02B 27/09; G02B 27/0944; G02B 30/50; G02B 30/56; G02B 5/32; G02B 13/22; G02B 21/0036; G02B 21/0056; G02B 21/0072; G02B 27/0031; G02B 27/0093; G02B 27/48; G02B 1/043; G02B 13/0095; G02B 17/008; G02B 17/08; G02B 19/0009; G02B 21/0068; G02B 21/082; G02B 21/086; G02B 23/2453; G02B 23/2469; G02B 23/26; G02B 26/12; G02B 26/121; G02B 26/123; G02B 27/0977; G02B 27/18; G02B 27/58; G02B 3/14; G02B 5/1833; G02B 5/3033; G02B 5/3041; G02B 5/3083; G02B 6/02; G02B 7/1821; G02B 17/0808; G02B 19/0047; G02B 19/0057; G02B 21/0024; G02B 21/0028; G02B 21/0084; G02B 21/084; G02B 21/361; G02B 26/0858; G02B 26/127; G02B 27/0012; G02B 27/0933; G02B 27/0955; G02B 27/106; G02B 27/14; G02B 27/144; G02B 27/145; G02B 27/149; G02B 27/16; G02B 27/642; G02B 5/005; G02B 5/122; G02B 5/1857; G02B 5/205; G02B 7/005; G02B 7/198; G01J 3/10; G01J 3/14; G01J 3/36; G01J 3/4406; G01J 1/42; G01J 2001/4247; G01J 1/4257; G01J 3/2803; G01J 3/44; G01J 5/0037; G01J 5/047; G01J 5/0808; G01J 5/10; G01J 1/04

See application file for complete search history.

(56) References Cited

U.S. PATENT DOCUMENTS

| | | | |
|---|---|---|---|
| 6,270,644 B1 | 8/2001 | Mathies | |
| 6,630,063 B1 | 10/2003 | Li | |
| 7,787,681 B2* | 8/2010 | Zhang | C40B 60/12 382/128 |
| 9,784,957 B2 | 10/2017 | Nackerud | |
| 2001/0035999 A1* | 11/2001 | Saito | G02B 26/123 359/197.1 |
| 2003/0044967 A1* | 3/2003 | Heffelfinger | G01J 3/14 356/319 |
| 2011/0290648 A1* | 12/2011 | Majlof | G01N 27/44708 204/603 |
| 2016/0349494 A1* | 12/2016 | Dohi | G02B 21/0048 |
| 2016/0368110 A1* | 12/2016 | Lu | G05B 19/402 |

(56) References Cited

U.S. PATENT DOCUMENTS

| | | | | |
|---|---|---|---|---|
| 2017/0160382 A1* | 6/2017 | Jungwirth | ............... | G01S 17/42 |
| 2018/0136126 A1 | 5/2018 | Chow | | |
| 2018/0154482 A1* | 6/2018 | Jeong | ................ | B23K 26/0643 |
| 2018/0272474 A1* | 9/2018 | Murakami | ........... | B23K 26/046 |
| 2018/0372483 A1* | 12/2018 | Moser | ................... | G01B 11/22 |
| 2020/0368846 A1* | 11/2020 | Matsuo | .................. | B23K 26/38 |

FOREIGN PATENT DOCUMENTS

| | | | | |
|---|---|---|---|---|
| CN | 111257282 A * | 6/2020 | ............ | G01N 21/01 |
| DE | 3037983 A1 | 4/1983 | | |
| DE | 102018220336 A1 * | 1/2020 | ........... | B23K 26/046 |
| EP | 0056426 A2 * | 7/1982 | | |
| EP | 0284660 A1 * | 10/1988 | | |
| EP | 0284660 A1 | 10/1988 | | |
| EP | 1757923 A2 * | 2/2007 | ......... | G01N 21/6428 |
| JP | H10239023 A * | 9/1998 | | |
| JP | 2000131282 A * | 5/2000 | ....... | G01N 27/44721 |
| JP | 2003-329590 | 11/2003 | | |
| JP | 2004037162 A * | 2/2004 | | |
| JP | 4174252 B2 * | 10/2008 | | |
| JP | 2010-243408 | 10/2010 | | |
| JP | 2016133373 A | 7/2016 | | |
| JP | 2016-145770 | 8/2016 | | |
| KR | 101310782 B1 * | 9/2013 | | |
| KR | 1947404 B1 * | 2/2019 | ............. | G01S 17/08 |
| WO | 96/23213 A1 | 8/1996 | | |
| WO | WO-9623213 A1 * | 8/1996 | ....... | G01N 27/44721 |
| WO | 01/25773 A1 | 4/2001 | | |
| WO | WO-0125773 A1 * | 4/2001 | ....... | G01N 27/44721 |
| WO | WO-2008118365 A1 * | 10/2008 | ........... | B08B 7/0042 |
| WO | WO-2010098363 A1 * | 9/2010 | ......... | G03B 21/2046 |
| WO | WO-2019127949 A1 * | 7/2019 | ......... | G01N 21/3563 |
| WO | WO-2019188913 A1 * | 10/2019 | ............ | B22F 3/1017 |
| WO | WO-2020045729 A1 * | 3/2020 | ........... | A61B 5/0095 |

OTHER PUBLICATIONS

Nikcevic, et al., Parallel separations using capillary electrophoresis on a multilane microchip with multiplexed laser induced fluorescence detection (Electrophoresis. Aug. 2010; 31(16):2796-2803. (16 pages).

Japanese Patent Office, Notice of Reason for Rejection, Patent Application No. 2022-56605, dated Dec. 15, 2023, with translation.

* cited by examiner

LASER ILLUMINATION TECHNIQUES FOR CAPILLARY ELECTROPHORESIS

CROSS REFERENCE TO RELATED APPLICATIONS

[Not Applicable]

BACKGROUND

Fluorescence can be used to enable detection technology for many fields including fundamental research, analytical chemistry, separation science, biochemical assay monitoring, and drug discovery. For example, the development of fluorescence-based, multi-capillary gel electrophoresis instruments enabled the completion of the human genome project ahead of schedule and ushered medical research into the era of personalized medicine.

In certain capillary electrophoresis (CE) systems fluorescence detection is performed using lasers. A laser light source provides a focused beam with a relatively narrow spectral width (e.g., 1-5 nm for laser diodes or even less, e.g., 0.01-0.001 nm for gas lasers), and a relatively high photon density, thereby enabling high sensitivity measurements even when the area of excitation is relatively small (e.g., on the order of tens of micrometers).

SUMMARY

According to certain techniques, a laser-line-generating system may generate and process a laser light to illuminate a capillary array. The laser-line-generating system may include a laser-light source, focusing optics (e.g., an aspherical lens), a first optical scanner, and a second optical scanner. The laser-light source may output a first laser light. The focusing optics may receive the first laser light and reduce a beam width of the first laser light. The first optical scanner (e.g., a first laser galvanometer) may receive the first laser light and output a first optical-scanner-outputted light by varying an angle of outputted light along a first dimension. The second optical scanner (e.g., a second laser galvanometer) may receive the first optical-scanner-outputted light and output a second optical-scanner-outputted light by varying an angle of outputted light along a second dimension. The second optical-scanner-outputted light may include or be a line, where the line includes dimensional components in both the first dimension and the second dimension. The system may further include an optical filter configured to reduce a spectral width of the laser light. The system may further include temperature-stabilizing componentry configured to stabilize a temperature of the laser-light source. The system may further include a spectrograph slit. A position of the laser line is adjustable to substantially correspond to a position of the spectrograph slit by adjusting operation of the first optical scanner and the second optical scanner. The system may further include a light detector and a laser driver. The light detector may receive a portion of the laser light and generate an output signal in response to a characteristic of the laser light. The laser driver may receive the output signal from the light detector and adjust a power provided to the laser-light source according to at least a value of the output signal and, for example, a command signal.

When laser galvanometers are used as optical scanners, the first galvanometer may be controlled by at least a first triangular wave signal and a first DC signal. The second laser galvanometer may be controlled by at least a second triangular wave signal and a DC second signal. The first laser galvanometer may have an oscillating mirror configured to deflect the first laser light between approximately −40° to +40°. The second laser galvanometer may include an oscillating mirror configured to deflect the first optical-scanner-outputted light between approximately −40° to +40°. The first laser galvanometer may have a scanning frequency of between approximately 100-1000 Hz. The second laser galvanometer comprises a scanning frequency of between approximately 100-1000 Hz.

According to certain techniques, a laser-line-generating system may generate and process a laser light to illuminate a capillary array. The laser-line-generating system may include a first laser-light source, a second laser-light source, first focusing optics (e.g., an aspherical lens), second focusing optics (e.g., an aspherical lens), a first optical scanner, and a second optical scanner. The first laser-light source may output a first laser light. The focusing optics may receive the first laser light and reduce a beam width of the first laser light. The second laser-light source may output a second laser light. The second focusing optics may receive the second laser light and reduce a beam width of the second laser light. The first optical scanner (e.g., a first laser galvanometer) may receive the first laser light and second laser light and output a first optical-scanner-outputted light by varying an angle of outputted light along a first dimension. The second optical scanner (e.g., a second laser galvanometer) may receive the first optical-scanner-outputted light and output a second optical-scanner-outputted light by varying an angle of outputted light along a second dimension. The second optical-scanner-outputted light may include or be a line, where the line includes dimensional components in both the first dimension and the second dimension. The system may further include a first optical filter configured to reduce a spectral width of the first laser light. The system may further include a second optical filter configured to reduce a spectral width of the second laser light. The system may further include temperature-stabilizing componentry configured to stabilize a temperature of the laser-light source. The system may further include a spectrograph slit. A position of the laser line is adjustable to substantially correspond to a position of the spectrograph slit by adjusting operation of the first optical scanner and the second optical scanner. The system may further include a first light detector, a first laser driver, a second light detector, and a second laser driver. The first light detector may receive a portion of the first laser light and generate a first output signal in response to a characteristic of the first laser light. The first laser driver may receive the first output signal from the first light detector and adjust a power provided to the first laser-light source according to at least a value of the first output signal and, for example, a command signal. The second light detector may receive a portion of the second laser light and generate a second output signal in response to a characteristic of the second laser light. The second laser driver may receive the second output signal from the second light detector and adjust a power provided to the second laser-light source according to at least a value of the second output signal and, for example, a command signal.

When laser galvanometers are used as optical scanners, the first galvanometer may be controlled by at least a first triangular wave signal and a first DC signal. The second laser galvanometer may be controlled by at least a second triangular wave signal and a DC second signal. The first laser galvanometer may have an oscillating mirror configured to deflect the first laser light between approximately −40° to +40°. The second laser galvanometer may include an oscillating mirror configured to deflect the first optical-scanner-outputted light between approximately −40° to +40°. The first laser galvanometer may have a scanning frequency of between approximately 100-1000 Hz. The second laser galvanometer comprises a scanning frequency of between approximately 100-1000 Hz.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

Figure 1:
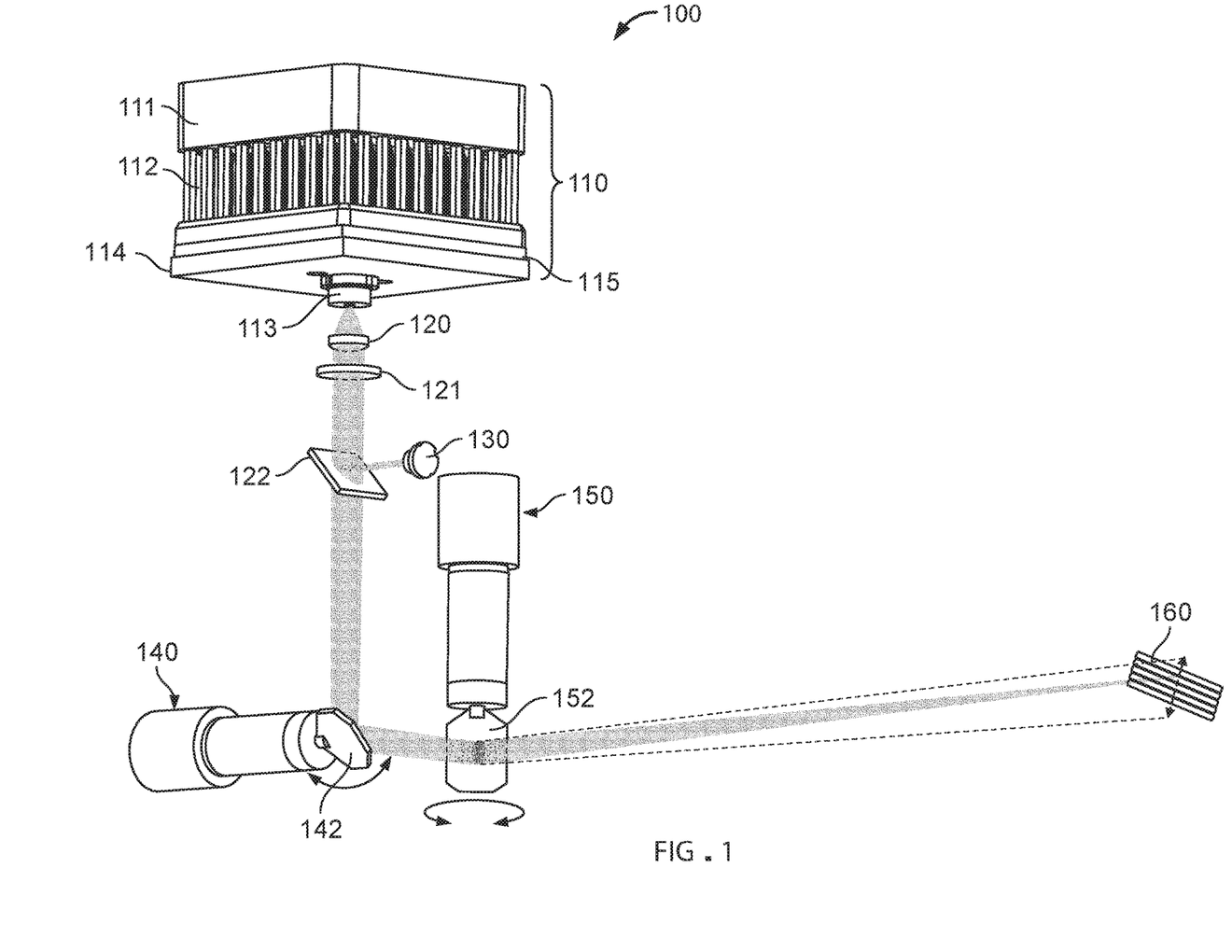
FIG. 1 illustrates a system for illuminating a portion of a capillary array with one laser, according to certain embodiments.

FIG. 1 illustrates a system 100 for illuminating a portion of a capillary array with one laser, according to certain embodiments. The system 100 may include a laser-source assembly 110, focusing optics 120, an optical filter 121, a beam splitter 122, a photodiode 130, a first optical scanner 140, and a second optical scanner 150. Light outputted from the second optical scanner 150 illuminates a portion of a capillary array 160.

The laser-source assembly 110 may include a laser diode 113, a heat sink 112, a fan 111, a laser base plate 114, and a thermo-electric cooling (TEC) element 115. The laser diode 113 may receive power from a driver 170 (not shown in FIG. 1, but see FIG. 6). The laser diode 113 may include a component such as a blue-green laser diode. The laser diode 113 may emit light such as at 485-495 nm or 505-520 nm. The light may have a power of 10-1000 mW, for example. The beam of the light may have a beam divergence of between 10-55 degrees. The laser base plate 114 may serve to thermally conduct or couple the laser diode 113 with the TEC element 115. The laser base plate 114 may have the same surface area or be similar in size to that of the TEC element 115. The laser base plate 114 may have a thickness of about 3 mm or ⅛". The laser base plate 114 may include mechanical parts (e.g., clamps) to facilitate holding the laser diode 113 onto the laser base plate 114. The TEC element 115 may substantially maintain or set the temperature of the laser diode 113. The TEC element 115 may include a Peltier device or other equivalent component (e.g., a liquid cooling system). The TEC element 115 may be able to control temperature in order to dissipate the laser heat generated during operation in order to maintain the laser temperature at the required precision, which may be between 0.1-1.0 degrees.

A heat sink 112 may be thermally coupled to the TEC element 115. The heat sink 112 may include a plurality of thermally conducting fins or columns separated by spaces of air. The heat sink 112 may include a material such as aluminum or copper. A fan 111 may be thermally coupled to the heat sink 112. The fan 111 may cause the TEC element 115 to heat up or cool down.

Figure 6:
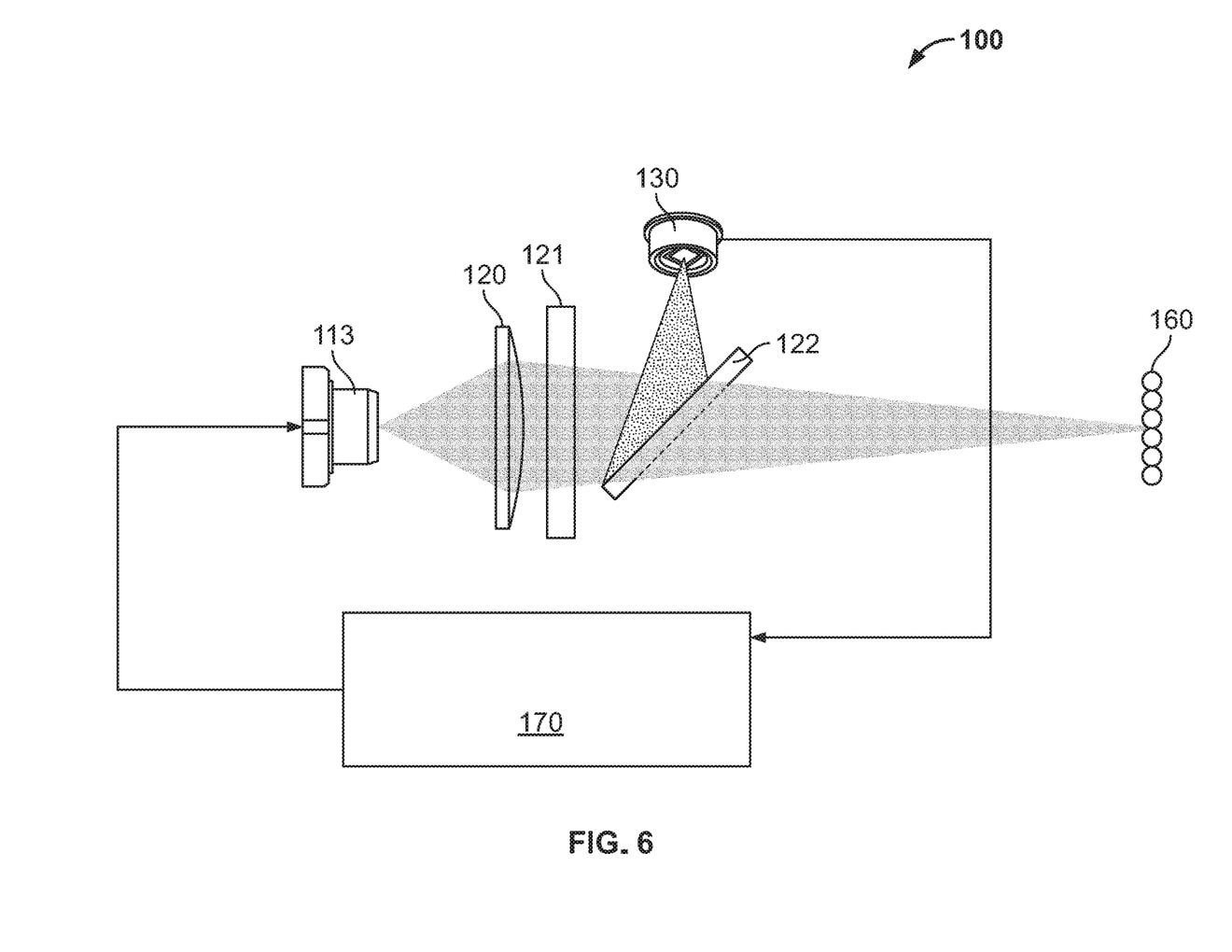
FIG. 6 depicts a functional block diagram of a system for illuminating a portion of a capillary array, according to certain embodiments.

As shown in FIG. 6, the laser driver 170 may receive feedback from photosensor 130 and drive the laser diode 113 accordingly. Some laser diodes 113 may have internal photosensors inside the laser case. In some embodiments, a feedback signal is directed to the appropriate input of the laser driver 170 from internal photosensor. In such an embodiment, the beam splitter 122 may not be needed. The laser driver 170 may also receive feedback from a temperature sensor (e.g., a thermistor or thermocouple; not shown) mounted proximate the laser diode 113 and/or a processor (not shown). The temperature sensor signal may be compared with the temperature set point and converted by a proportional-integral-differential (PID) controller into voltage applied to TEC element 115 to stabilize laser diode 113 temperature at the set point. This could be a DC voltage or pulse-width/frequency-modulated voltage.

The focusing optics 120 may be a single lens or include more than one optical element. The focusing optics 120 may include an aspherical lens. Such an aspherical lens may be formed by one or two aspherical surfaces to focus a relatively divergent (up to 55 degree or even more) laser beam. The focusing optics 120 may have a numerical aperture that is sufficient to intercept most laser beam. In some embodiments, the focusing optics 120 may include a single or a combination of different optical elements, e.g. spherical, aspherical, cylindrical, GRIN lenses, and/or on and off axis mirrors. The aspherical lens may be advantageous in some respects such as, for example, achieving a high numerical aperture sufficient to intercept a relatively divergent laser beam. Such a lens or optical elements may be used to focus the laser beam emitted by the laser diode 113. The focusing optics 120 may produce a laser beam with a relatively narrow width to provide relatively high intensity (optical power density) in the laser line. The theoretical limit for the beam size is a diffraction limited beam (calculated from light wave diffraction theory). At the focal point where the laser beam hits the capillary array 160, the beam width may be 10-100 microns. The laser beam may be wider, but signal quality (e.g., signal-to-noise ratio, time, spectral and spatial resolutions) may degrade.

The optical filter 121 may substantially attenuate light that may otherwise interfere with the advantageous fluorescence employed by a CE process. According to one embodiment, the optical filter 121 may pass wavelengths longer than laser, e.g., with the longest wavelength at plus 3-10 nm, while substantially attenuating wavelengths outside of that range. Such attenuated light frequencies may otherwise interfere with a CE process, such as the fluorescence signal at the shortest wavelengths. The optical filter 121 may be located as shown, or it may be positioned anywhere between the laser diode 113 and the capillary array 160. The optical filter 121 may be high-pass, low-pass, or band pass. The optical filter 121 may include more than one filtering component (for example, a high-pass filter and low-pass filter could be combined to achieve a band pass effect).

The beam splitter 122 may optionally be employed. Whereas some laser diodes (e.g., laser diode 113) may have internal photosensors to monitor laser power for feedback control, if a laser diode does not have an internal photosensor, the beam splitter 122 may be inserted in the laser beam path such that a relatively small portion of laser light (for example, 0.1-5%) may be split off and directed towards an external photosensor 130. Such a photosensor 130 may monitor laser power.

According to certain embodiments, optical scanners 140, 150 may be employed to convert a laser beam with an elliptical or circular cross-sectional beam-width profile into a laser line. As depicted, optical scanners 140, 150 are laser galvanometers. Other optical scanners 140, 150 are also contemplated such as one or more solid state electro-optic beam deflectors, piezoelectric devices, MEMS (Microelectromechanical Systems), or voice coil beam steering units. Laser galvanometers may be useful because of their market availability, reliability, relatively low cost, convenience of operation, lack of need for a high voltage source like for piezoelectric deflectors, and having a scanning speed much higher than the fluorescence detecting camera framing rate.

The first optical scanner 140 may include a laser galvanometer and may employ an oscillating mirror 142. The range of oscillation of the mirror 142 may provide laser beam deflection up to ±40° with respect to the central position of the mirror 142 (at 0 degrees). The rate of oscillation of the first optical scanner 140 may be between approximately 100-1000 Hz (e.g., at least 10-20 times more than camera framing rate). The first optical scanner 140 need not oscillate during operation. For example, the rotational amount (e.g., as measured in degrees) may remain static during operation. This static value may be adjustable (for example, between ±40°).

The first optical scanner 140 may output a laser line oriented along a first dimension. By "line" it is understood that the line is only a line segment, and the entirety of the line does not exist at any instant. Instead, the laser beam still has a substantially circular or elliptical cross-sectional profile at any instant. But, because the beam is being moved over time, the movement of the beam is along the path of a line, and a registering camera observes not a single laser spot, but a solid line whereby all the capillaries are illuminated relatively equally during a single camera frame exposure. The first dimension may be perpendicular to the orientation of the individual capillaries in the capillary array 160. For example, if the individual capillaries are oriented horizontally, the orientation of the line outputted by the first optical scanner 140 may be substantially vertical.

The length and/or endpoint positions of the line segment outputted by the first optical scanner 140 may be adjusted by changing the starting and stopping points of oscillation. For example, a position of the first (e.g., top) endpoint of the line segment may correspond to a first maximum degree of rotation of oscillation for the oscillating mirror 142 (or similar component in a non-laser-galvanometer optical scanner 140) as determined by the control signal that controls the degree of rotation of the oscillating mirror 142. The second endpoint (e.g., bottom) of the line segment may correspond to the second maximum degree of rotation of oscillation for the oscillating mirror 142 (or similar component in a non-laser-galvanometer optical scanner 140).

The first optical scanner 140 may be driven with a signal, such as a triangular wave, to provide linear movement of a laser beam. If another type of movement is preferred (e.g., quadratic, logarithmic, etc.), a different character of control signal may be provided to the first optical scanner 140. The control signal may include both an AC component (e.g., a triangular wave component) and a DC component. The DC component may determine a centerpoint or orientation of a line (or a given dimension of a line), whereas the AC component may determine the length of the line (or the length of the line along a given dimension). A triangular wave may result in a relatively constant speed of laser beam motion for relatively equal illumination of all capillaries in the capillary array 160.

The length of the line outputted by the first optical scanner 140 may be chosen according to the width of the capillary array 160 (i.e., the distance between the edges of the array as measured perpendicularly to the primary orientation of the individual capillaries). Such a width of the capillary array 160 may be between approximately 4-30 mm depending on, for example, the number of capillaries, spacing between capillaries, and diameter of individual capillaries.

Figure 7:
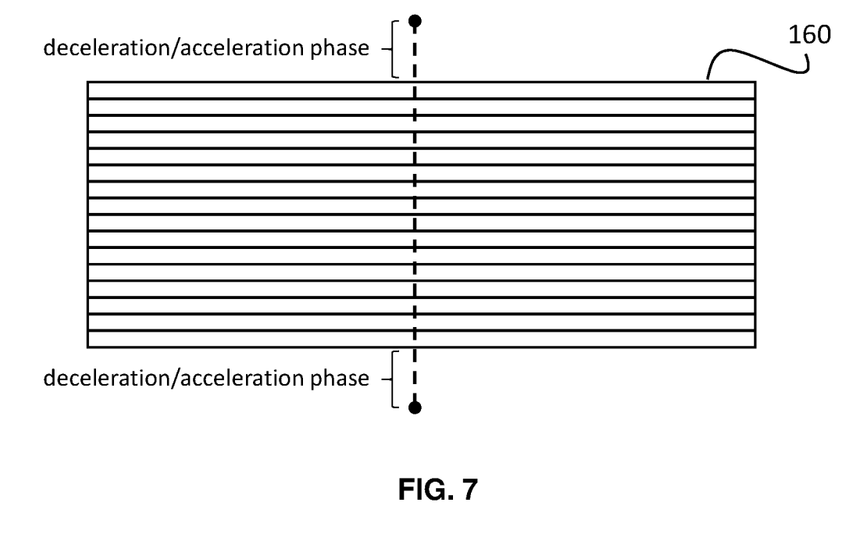
FIG. 7 illustrates a principle of a technique whereby the length of a laser line is greater than a width of a capillary array being illuminated, according to certain embodiments.

FIG. 7 illustrates a principle of a technique whereby the length of a laser line is greater than a width of a capillary array being illuminated, according to certain embodiments. As shown in FIG. 7, the length of the line (the "line" is illustrated as the broken line with endpoints on the top and bottom) outputted by the first optical scanner 140 may be chosen to be greater than the width of the capillary array 160, as near the endpoints of the line, scanning may be relatively uneven. When laser beam approaches either endpoint, the first optical scanner 140 must stop to reverse the direction of motion (decelerate, change directions, and then accelerate). This increases the time of laser illumination in the regions proximate to the endpoints (as compared to when the sweep of the laser beam has a relatively constant speed). To avoid such non-even illumination on the capillary array 160, the length of laser line may be selected to be longer than the width of the capillary array 160 such that the portions of the line not illuminating the capillary array 160 (the portion past the edges) is the portion containing an undue amount of illumination irregularity. In this manner, the speed of the laser beam that forms the line may be relatively constant in the portion of the laser line that impinges on the capillary array 160. Consequently, the illumination or light intensity of the line may be relatively constant in the portion of the line that intersects with the capillary array 160. To reduce the impact of irregular illumination during the deceleration/acceleration phases, the line may extend a certain distance above and below the capillary array 160. Such a distance for each non-impinging portion of the laser line may depend on parameters of the first optical scanner 140, such as mechanical inertia, controller performance, and may also depend on other parameters such as the precision of capillary position detection. For example, the entire length of the line may be 9-10 mm accounting for (1) the width of the capillary array 160 (e.g., 4.7 mm), (2) the first overage segment, and (3) the second overage segment. This extra distance (overage segments) may be the portions of the line during which deceleration/acceleration phases of oscillation are taking place.

The technique for sizing the laser line with respect to the width of the capillary array 160 may be also applicable for determining the parameters of operation for both the first optical scanner 140 and the second optical scanner 150. For example, the phases of deceleration and acceleration in the opposite direction for both the first optical scanner 140, and the second optical scanner 150 may correspond (all or in part) to the portions of the laser line that extend past the width of the capillary array 160.

The second optical scanner 150 may receive the light outputted from the first optical scanner 140. The second optical scanner 150 may be similar in many respects to the first optical scanner 140. The second optical scanner 150 may include a laser galvanometer and may employ an oscillating mirror 152. The range of oscillation of the mirror 152 may provide laser beam deflection up to ±40°. The rate of oscillation of the second optical scanner 150 may be between approximately 100-1000 Hz (e.g., at least 10-20 times more than the camera framing rate). The second optical scanner 150 may output a laser line with components oriented along a second dimension. The second dimension may be perpendicular to the first dimension and/or parallel to the orientation of the individual capillaries in the capillary array 160. For example, if the individual capillaries are oriented horizontally, the second dimension of the line outputted by the second optical scanner 150 may be substantially horizontal. The second optical scanner 150 need not oscillate during operation. For example, the rotational amount (e.g., as measured in degrees) may remain static during operation. This static value may be adjustable (for example, between ±40°). The output of the second optical scanner 150 may be directed at the capillary array 160. Like the first optical scanner 140, the second optical scanner 150 may be driven with a control signal that includes an AC component such as a triangular wave. For example, the control signal may be a combination of a DC signal to set the orientation of the line and an AC signal to determine the length of the line (or at least the orientation and length of the line along one dimension). If the AC component is the same for both optical scanners 140/150 but with a different amplitude, the second optical scanner 150 may tilt the laser line in one direction or another (depending of the relative differences of the AC voltage phases). In this configuration, the first optical scanner 140 may determine the laser line length, and the second optical scanner 150 may determine the laser line orientation/tilt. Control of the tilt angle may compensate for mechanical imperfectness of the laser module assembly, thereby increasing the accuracy and stability of the system in general.

With a triangular wave signal applied to the first optical scanner 140 and/or the second optical scanner 150, the laser beam may move linearly between the top and bottom endpoints (turning points) with acceleration and deceleration near endpoints. However, the control signal(s) applied to the first optical scanner 140 and/or the second optical scanner 150 may be more complicated. For example, the control signal may cause the first optical scanner 140 and/or the second optical scanner 150 to cause the laser beam to "jump" more quickly from one capillary to another in the capillary array 160. When the scanner(s) 140/150 are not causing the laser beam to "jump" between capillaries, the movement of the laser beam in the laser line may slow down or linger (or possibly even momentarily stop) when it is impinging on a given capillary. Thus, the movement of the laser beam along the laser line may include different phases including phases for when the laser beam is impinging on a given capillary, jumping between capillaries, and slowing down or accelerating proximate the endpoints of the laser line. During the jump and/or slow-down phases, laser power may be modulated (e.g., reduced/increased or switched off/on). Similarly, the laser power may be modulated when the laser beam is not impinging on the capillary array 160 (i.e., extends beyond the capillary array 160). The position of the individual capillaries in the capillary array 160 may be pre-determined with a spatial calibration test. During such a test, the fluorescence signal may be measured from each capillary with the laser beam in a known position. Once the positions of the individual capillaries in the capillary array 160 are known (or inferred), the control signal(s) for the first optical scanner 140 and/or the second optical scanner 150 may be determined.

Figure 2:
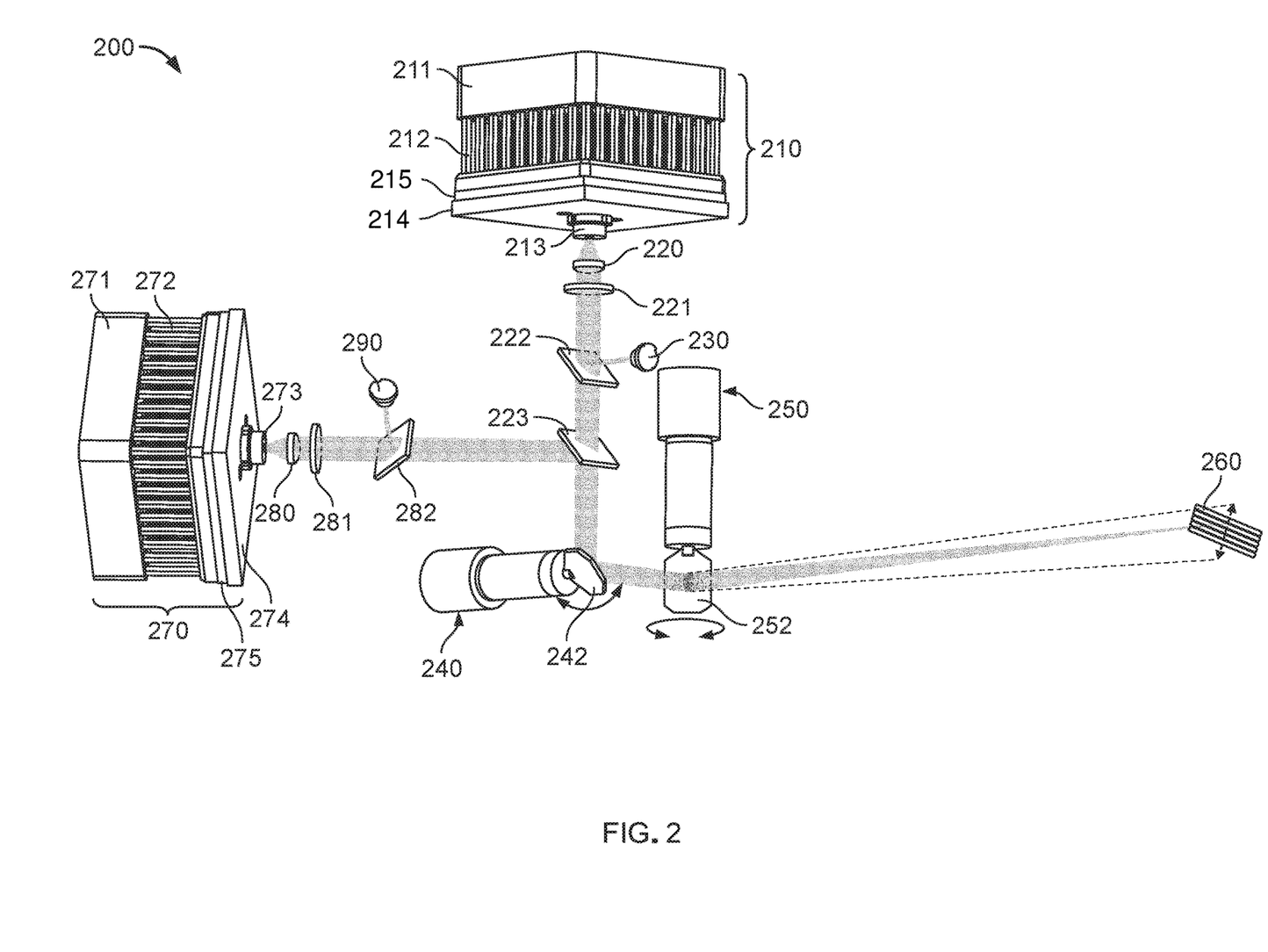
FIG. 2 illustrates a system for illuminating a portion of a capillary array with two lasers, according to certain embodiments.

FIG. 2 illustrates a system 200 for illuminating a portion of a capillary array 260 with two lasers, according to certain embodiments. The capillary array 260 may be similar to or identical to capillary array 160. The system 200 may be similar to or identical to the system 100, except that the system 200 may include two laser-source assemblies 210 and 270 (or more than two), whereas the system 100 may only have one laser-source assembly 110. Therefore, the discussion here of the system 200 does not repeat every detail as discussed in conjunction with regard to the system 100.

System 200 may include a first laser-source assembly 210, first focusing optics 220, a first optical filter 221, a first beam splitter 222, a first photodiode 230, a second laser-source assembly 270, a second focusing optics 280, a second optical filter 281, a second beam splitter 282, a second photodiode 290, a beam combiner 223, a first optical scanner 240, a second optical scanner 250, and a capillary array 260. The first laser-source assembly 210, first focusing optics 220, the first optical filter 221, the first beam splitter 222, the first photodiode 230, the first optical scanner 240, the second optical scanner 250, and capillary array 260 may correspond and be identical or similar to components 110, 120, 121, 122, 130, 140, 150, and 160 (respectively) described with regard to FIG. 1. The first laser-source assembly 210, may include a laser diode 213, a laser plate 214, a TEC element 215, a heat sink 212, and a fan 211, which may be similar or identical to components 110, 113, 114, 115, 112, and 111 (respectively) shown and described with respect to FIG. 1.

Components 270, 280, 281, 282, and 290 may correspond and be identical or similar to components 110, 120, 121, 122, 130 (respectively) described with regard to FIG. 1. The second laser-source assembly 270 may include a laser diode 273, a laser plate 274, a TEC element 275, a heat sink 272, and a fan 271, which may be similar or identical to components 110, 113, 114, 115, 112, and 111 (respectively) shown and described with respect to FIG. 1. Assemblies 210 and 270 may be similar except for the wavelengths of the laser lights produced by the respective diodes in the assemblies. This may be useful if a dye kit used for DNA analysis contains two or more "donor" dyes—e.g., dyes that adsorb laser light at different dominant wavelengths (different for each donor dye) and transfer adsorbed energy to other dyes, which cannot efficiently adsorb laser energy, by any mechanism. The lasers may be similar (for example, laser diodes with wavelengths of 493 nm and 518 nm for effective excitation of FAM and Joe dyes), or the lasers can be different types, e.g., one laser can be a laser diode and another one can be a solid state or gas laser.

The laser diode 273, however, may be different from the laser diode 213. For example, the laser diode 273 may emit a light having a different frequency spectrum than what the laser diode 213 emits. For example, the laser diode 213 may emit a light having a frequency spectrum of approximately 485-495 nm with a peak at approximately 493 nm. The laser diode 273 may emit a light having a frequency spectrum of approximately 510-520 nm with a peak at approximately 515 nm.

The optical filter 221 may serve to substantially attenuate light that may interfere with the advantageous fluorescence employed by a CE process. According to one embodiment, the optical filter 221 may pass wavelengths shorter than 520 nm while substantially attenuating wavelengths longer than 520 nm. Such attenuated light frequencies may otherwise interfere with a CE process such as coincidence of laser excitation wavelength with fluorescence light wavelength. The optical filter 221 may be located as shown, or it may be positioned anywhere between the laser diode 213 and the capillary array 260. The optical filter 221 may be high-pass, low-pass, or band pass. The optical filter 221 may include more than one filtering component (for example, a high-pass filter and low-pass filter could be combined to achieve a band pass effect).

The optical filter 281 may serve to substantially attenuate light that may interfere with the advantageous fluorescence employed by a CE process. According to one embodiment, the optical filter 281 may pass wavelengths shorter than 520 nm while substantially attenuating wavelengths outside of that range. Such attenuated light frequencies may otherwise interfere with a CE process such as coincidence of laser excitation wavelength with fluorescence light wavelength. The optical filter 281 may be located as shown, or it may be positioned anywhere between the laser diode 273 and the capillary array 260. The optical filter 281 may be high-pass, low-pass, or band pass. The optical filter 281 may include more than one filtering component (for example, a high-pass filter and low-pass filter could be combined to achieve a band pass effect).

The emitted light from the laser diode 113 and the laser diode 273 may be combined at the beam combiner 223 to form a combined laser beam. This combined laser beam may then be processed by the first optical scanner 240 with mirror 242 and the second optical scanner 250 with mirror 252 as discussed with respect to the first optical scanner 140 with mirror 142 and the second optical scanner 150 with mirror 152 in the context of FIG. 1.

Figure 3:
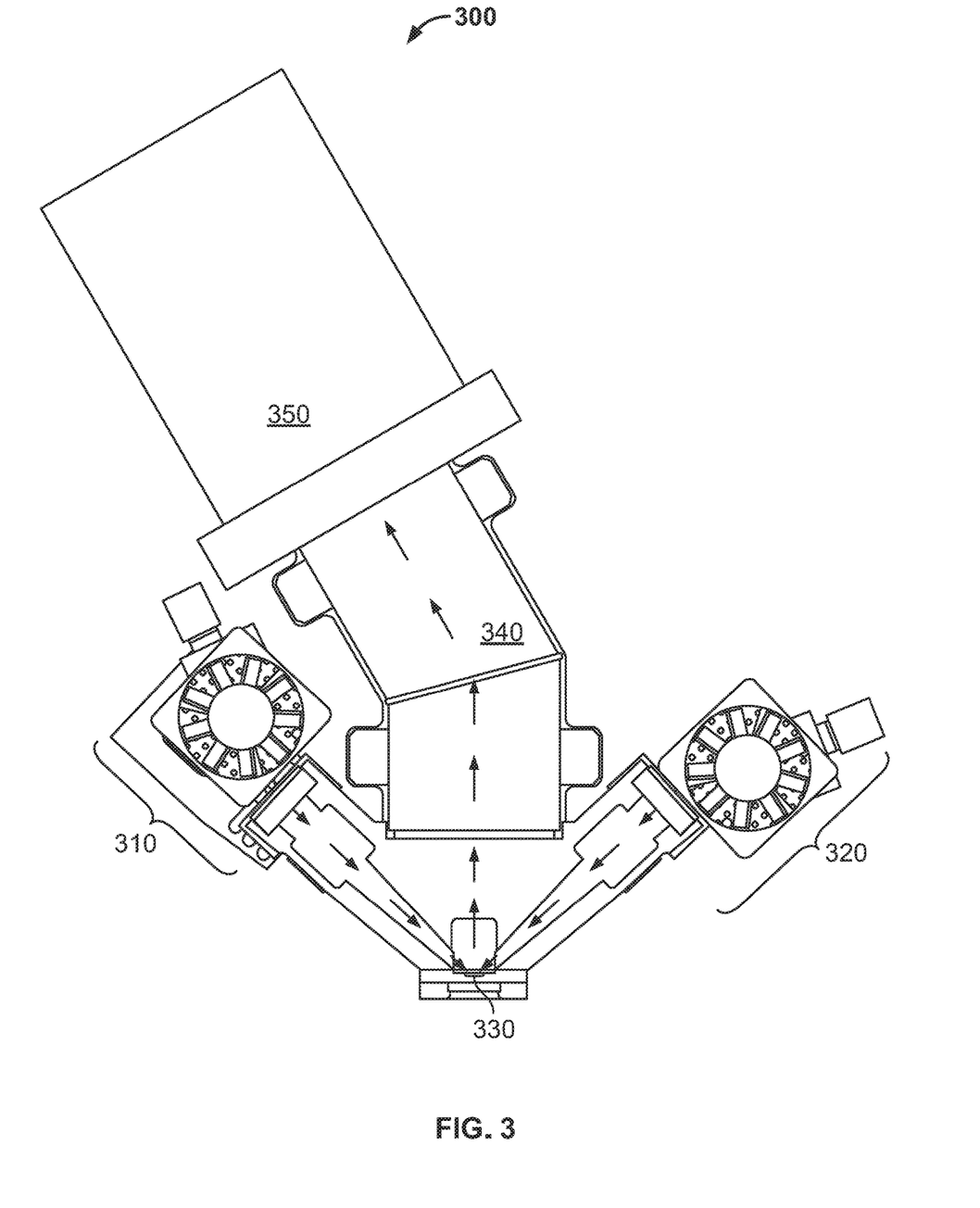
FIG. 3 illustrates a system for illuminating and imaging a capillary array, according to certain embodiments.

FIG. 3 illustrates a top view of a system 300 for illuminating and imaging a capillary array 330, according to certain embodiments. The system 300 may include laser line generators 310 and 320. Each of the laser line generators 310 and 320 may correspond to systems 100 or 200, depending on whether one or two channels of laser illumination are implemented. For example, laser line generator 310 may correspond to or be identical to system 100, and laser line generator 320 may correspond to or be identical to system 100. As another example, laser line generator 310 may correspond to or be identical to system 200, and laser line generator 320 may correspond to or be identical to system 200. Light from the laser line generators 310, 320 may converge and illuminate the same location on the capillary array 330. The laser line generators 310, 320 may generate substantially identical laser lines that converge and illuminate the same location on the capillary array 330. A two-laser system may be used to make the process of laser line combining more precise and independent from another laser. The angle between the first laser beam and the capillary array 330 and the angle between the second laser beam and the capillary array 330 may be substantially identical, but not necessarily.

Some of the laser light that impinges on the capillary array 330 may be reflected back towards an optical processing system 340. Fluorescence light from the capillary array 330 (that passes through a slit) may be converted to a parallel beam via a first optical element (not shown). This parallel beam may be converted to fluorescence spectrum by a dispersing element (e.g., a diffraction grating; not shown). Spectrally dispersed light may then be focused a second optical element on an optical sensor 350 (e.g. CCD or CMOS video camera, such as a 2D optical sensor). The optical sensor 350 may image spectra from all capillaries separately and simultaneously. Using a 2D optical camera may allow simultaneous analysis of any number of capillaries limited only by camera resolution. Each optical element (or a subset of elements) in optical processing system 340 may contain a filter to block laser light and transmit fluorescence light (e.g., longer than 525 nm).

Figure 4:
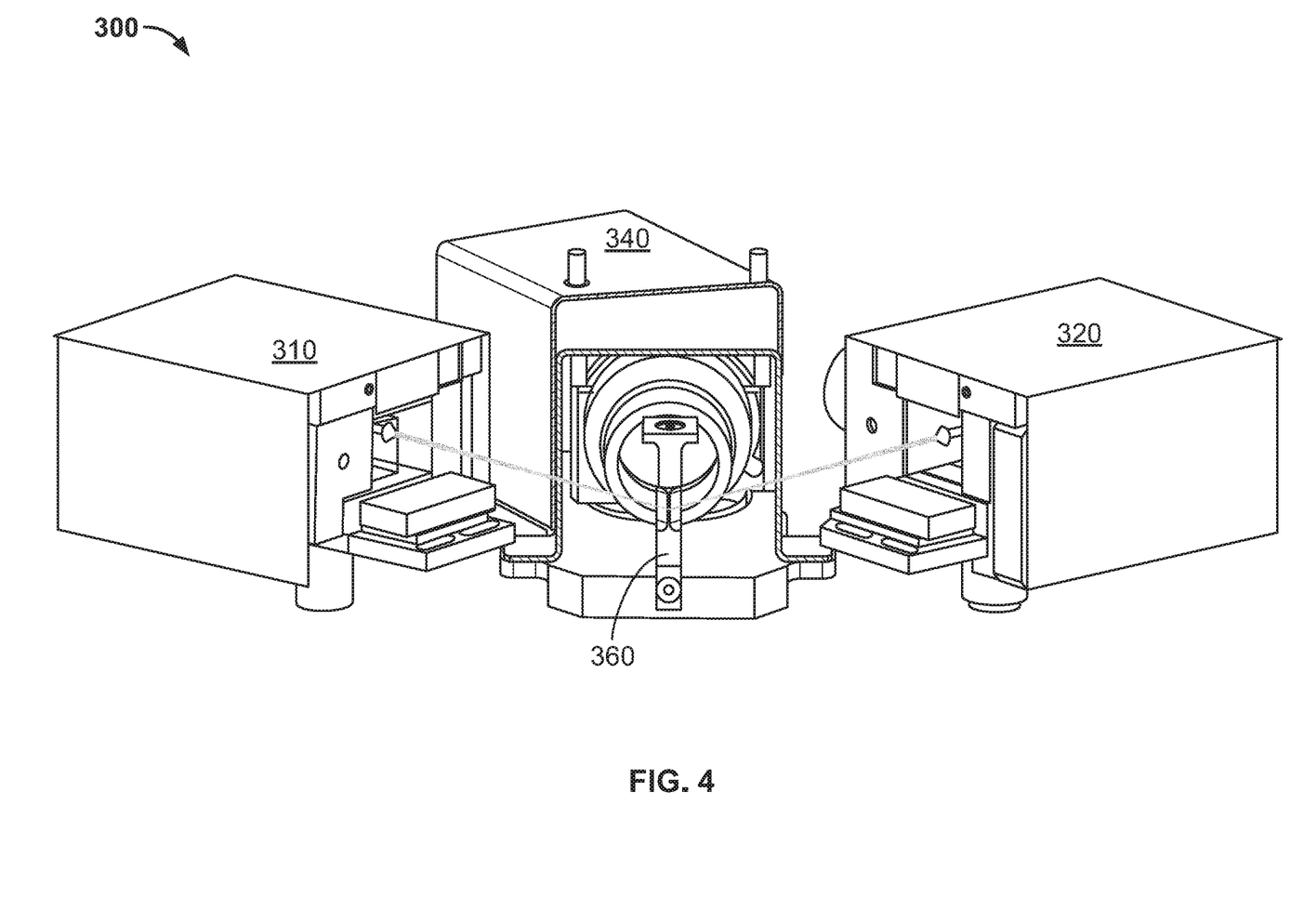
FIG. 4 illustrates a system for illuminating and imaging a capillary array, according to certain embodiments.
Figure 5:
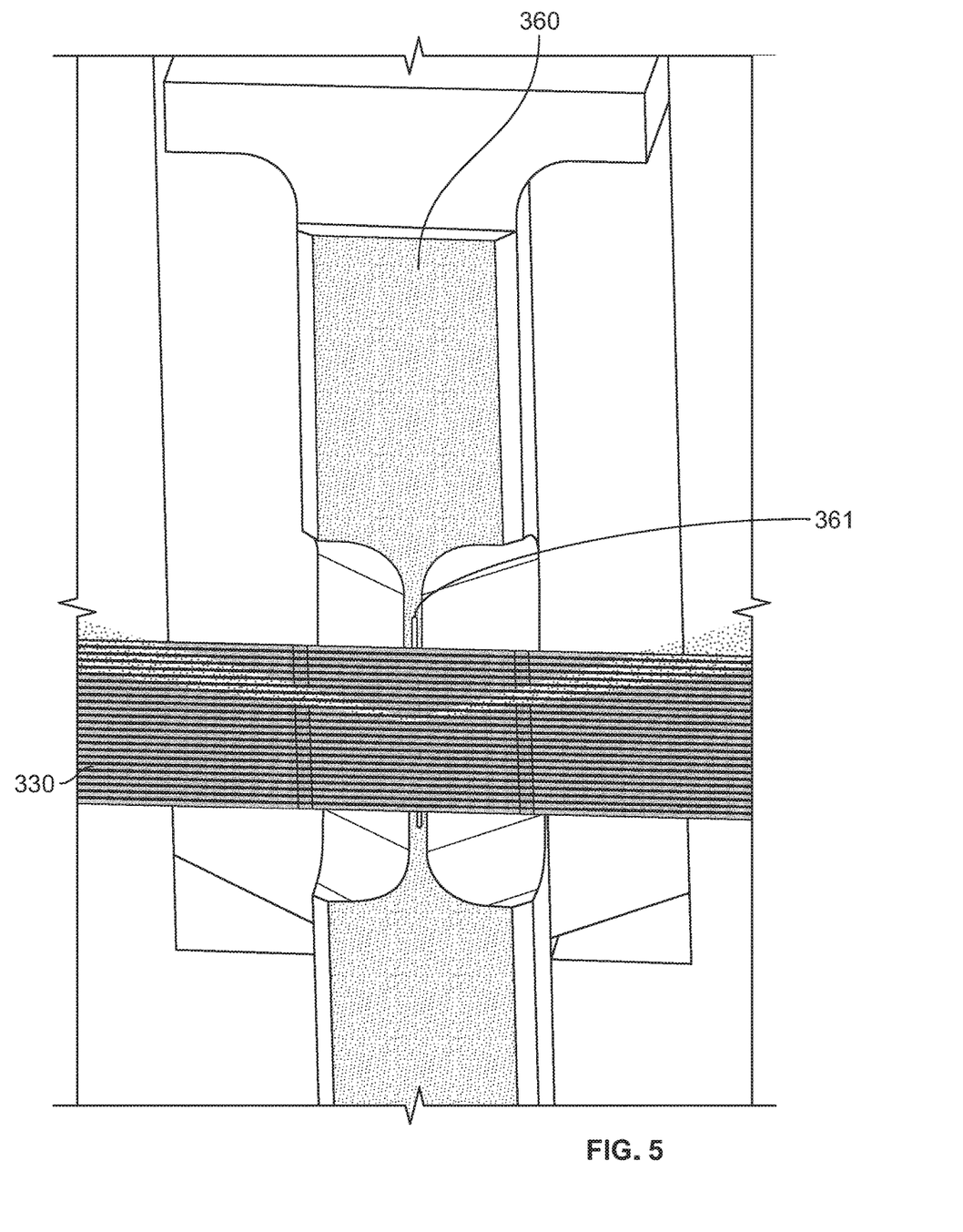
FIG. 5 illustrates illumination of a capillary array and a slit block, according to certain embodiments.

FIG. 4 illustrates a perspective view of a system 300 for illuminating and imaging a capillary array, according to certain embodiments. FIG. 5 illustrates a slit block 360 and illumination of a capillary array 330 with laser beams, according to certain embodiments. A slit block 360 may include two recesses and a slit 361 (e.g., a spectrograph slit) in between the recesses. The slit 361 may be 10-1000 microns wide depending on required spatial, spectral, and time resolution. For example, the slit 361 may be 140 microns wide. The slit may be, e.g., 5-20 mm long, depending on number of capillaries under test. For example, the slit 361 may be 10 mm long. The laser beams may travel through the recesses and impinge on the capillary array 330. Some of the light from the laser beams may be reflected from the capillary array 330 and may travel through the slit 361 in the slit block.

The laser lines formed by each of the laser beams may be positioned using optical scanners as described herein. The laser lines may be positioned using the optical scanners such that the lines align with the slit 361 in the slit block 360. To find an effective position of the laser line(s), sweeping may be performed in both dimensions (e.g., X and Y) separately. The signal from each capillary, or total signal from all capillaries, may then be measured. Based on the degree of illuminance detected by the optical sensor 350, the preferred line orientation may be determined (e.g., a peak illuminance may indicate alignment with the slit in one or more dimensions).

According to one technique, for a given laser-generating system, one of the optical scanners may be used to set the length of the laser line while the other optical scanner may be used to move the line laterally until the laser line aligns with the slit 361. According to this technique, the optical scanner that moves the line laterally may have a static (but adjustable) mirror position. For example, the lateral laser line position may be periodically adjusted to maintain the laser line at a preferred position with respect to the slit.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A laser-line-generating system configured to generate and process a laser light to illuminate a capillary array having a plurality of capillaries having an elongated dimension, wherein an orientation of the elongated dimension of the plurality of capillaries defines a reference dimension, the laser-line-generating system comprising:
    a laser-light generator, comprising:
        a laser-light source configured to output a laser light;
        focusing optics configured to receive the laser light and reduce a beam width of the laser light;
        a first optical scanner configured to receive the laser light, and output a first optical-scanner-outputted light by varying an angle of the first optical-scanner-outputted light along a first dimension;

a second optical scanner configured to receive the first optical-scanner-outputted light, and output a second optical-scanner-outputted light by varying an angle of the second optical-scanner-outputted light along a second dimension different than the first dimension; and wherein the second optical-scanner-outputted light comprises a line, wherein the line includes a segment, wherein the segment is defined by a single path in one direction from a first point to a second point, wherein the segment includes dimensional components in both the first dimension and the second dimension, wherein the first dimension and the second dimension are determined with respect to the reference dimension, and wherein the first dimension is perpendicular with respect to the second dimension, and the first optical scanner is configured to receive at least a first triangular wave signal and a first DC signal to control the first optical scanner; and the second optical scanner is configured to receive at least a second triangular wave signal and a second DC signal to control the second optical scanner.

2. The laser-line-generating system of claim 1, wherein:
the first optical scanner comprises a first laser galvanometer; and
the second optical scanner comprises a second laser galvanometer.

3. The laser-line-generating system of claim 2, wherein:
the first laser galvanometer comprises an oscillating mirror configured to deflect the laser light between approximately −40° to +40°; and
the second laser galvanometer comprises an oscillating mirror configured to deflect the first optical-scanner-outputted light between approximately −40° to +40°.

4. The laser-line-generating system of claim 2, wherein:
the first laser galvanometer comprises a scanning frequency of between approximately 100-1000 Hz; and
the second laser galvanometer comprises a scanning frequency of between approximately 100-1000 Hz.

5. The laser-line-generating system of claim 1, further comprising:
a light detector configured to receive a portion of the laser light, and generate an output signal in response to a characteristic of the laser light; and
a laser driver configured to receive the output signal from the light detector, and adjust a power provided to the laser-light source according to a value of the output signal.

6. A laser-line-generating system configured to generate and process a laser light to illuminate a capillary array having a plurality of capillaries having an elongated dimension, wherein an orientation the elongated dimension of the plurality of capillaries defines a reference dimension, the laser-line-generating system comprising:
a first laser-light source configured to output a first laser light;
first focusing optics configured to receive the first laser light and reduce a beam width of the first laser light;
a second laser-light source configured to output a second laser light;
second focusing optics configured to receive the second laser light and reduce a beam width of the second laser light;
a first optical scanner configured to receive the first laser light, receive the second laser light, and output a first optical-scanner-outputted light by varying an angle of the first optical-scanner-outputted light along a first dimension;

a second optical scanner configured to receive the first optical-scanner-outputted light, and output a second optical-scanner-outputted light by varying an angle of the second optical-scanner-outputted light along a second dimension different than the first dimension; and wherein the second optical-scanner-outputted light comprises a line, where the line includes dimensional components in both the first dimension and the second dimension, and wherein the first dimension and the second dimension are determined with respect to the reference dimension.

7. The laser-line-generating system of claim 6, wherein:
the first optical scanner comprises a first laser galvanometer; and
the second optical scanner comprises a second laser galvanometer.

8. The laser-line-generating system of claim 7, wherein:
the first laser galvanometer is controlled by at least a first triangular wave signal and a first DC signal; and
the second laser galvanometer is controlled by at least a second triangular wave signal and a first DC signal.

9. The laser-line-generating system of claim 7, wherein:
the first laser galvanometer comprises an oscillating mirror configured to deflect the first laser light between approximately −40° to +40°; and
the second laser galvanometer comprises an oscillating mirror configured to deflect the first optical-scanner-outputted light between approximately −40° to +40°.

10. The laser-line-generating system of claim 7, wherein:
the first laser galvanometer comprises a scanning frequency of between approximately 100-1000 Hz; and
the second laser galvanometer comprises a scanning frequency of between approximately 100-1000 Hz.

11. The laser-line-generating system of claim 6, further comprising:
a first light detector configured to receive a portion of the first laser light, and generate a first output signal in response to a characteristic of the first laser light;
a second light detector configured to receive a portion of the second laser light, and generate a second output signal in response to a characteristic of the second laser light;
a first laser driver configured to receive the first output signal, and adjust a power provided to the first laser-light source according to a value of the first output signal; and
a second laser driver configured to receive the second output signal, and adjust a power provided to the second laser-light source according to a value of the second output signal.

12. The laser-line-generating system of claim 1, further comprising an optical sensor configured to receive reflected laser light reflected by the plurality of capillaries.

13. The laser-line-generating system of claim 12, further comprising a spectrograph slit, wherein a position of the laser line is adjustable to substantially correspond to a position of the spectrograph slit by adjusting operation of the first optical scanner and the second optical scanner, and wherein the spectrograph slit is configured to receive the reflected laser light.

14. The laser-line-generating system of claim 1, further comprising an additional laser-light generator, comprising:
an additional laser-light source configured to output an additional laser light, comprising:
additional focusing optics configured to receive the additional laser light of the additional laser-light source and reduce a beam width of the additional laser light;

an additional first optical scanner configured to receive the additional laser light, and output an additional first optical-scanner-outputted light by varying an angle of the additional first optical-scanner-outputted light along the first dimension;

an additional second optical scanner configured to receive the additional first optical-scanner-outputted light, and output an additional second optical-scanner-outputted light by varying an angle of the additional second optical-scanner-outputted light along the second dimension; and wherein the additional second optical-scanner-outputted light comprises an additional line, wherein the additional line includes an additional segment, wherein the additional segment is defined by a single path in one direction from an additional first point to an additional second point, wherein the additional segment includes dimensional components in both the first dimension and the second dimension.

15. The laser-line-generating system of claim 14, wherein the segment and the additional segment illuminate a same location on the capillary array.

16. The laser-line-generating system of claim 6, further comprising an optical sensor configured to receive reflected laser light reflected by the plurality of capillaries.

17. The laser-line-generating system of claim 16, further comprising a spectrograph slit, wherein a position of the laser line is adjustable to substantially correspond to a position of the spectrograph slit by adjusting operation of the first optical scanner, the second optical scanner, the additional first optical scanner, and the additional second optical scanner, and wherein the spectrograph slit is configured to receive the reflected laser light.

18. The laser-line-generating system of claim 6, further comprising an additional laser-light generator, comprising:

an additional first laser-light source configured to output an additional first laser light;

additional first focusing optics configured to receive the additional first laser light and reduce a beam width of the additional first laser light;

an additional second laser-light source configured to output an additional second laser light;

additional second focusing optics configured to receive the additional second laser light and reduce a beam width of the additional second laser light;

an additional first optical scanner configured to receive the additional first laser light, receive the additional second laser light, and output an additional first optical-scanner-outputted light by varying an angle of the additional first optical-scanner-outputted light along the first dimension;

an additional second optical scanner configured to receive the additional first optical-scanner-outputted light, and output an additional second optical-scanner-outputted light by varying an angle of the additional second optical-scanner-outputted light along the second dimension; and wherein the additional second optical-scanner-outputted light comprises an additional line, wherein the additional line includes an additional segment, wherein the additional segment is defined by a single path in one direction from an additional first point to an additional second point, wherein the additional segment includes dimensional components in both the first dimension and the second dimension.

19. The laser-line-generating system of claim 14, wherein the segment and the additional segment illuminate a same location on the capillary array.

* * * * *